(12) United States Patent
Maghoul et al.

(10) Patent No.: US 9,122,756 B2
(45) Date of Patent: *Sep. 1, 2015

(54) ON-LINE SOCIAL SEARCH

(71) Applicant: Google Inc., Mountain View, CA (US)

(72) Inventors: Farzin Maghoul, Hayward, CA (US);
Shiv Ramamurthi, San Francisco, CA (US)

(73) Assignee: Google Inc., Mountain View, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 13/911,702

(22) Filed: Jun. 6, 2013

(65) Prior Publication Data

US 2013/0275405 A1 Oct. 17, 2013

Related U.S. Application Data

(63) Continuation of application No. 12/970,732, filed on Dec. 16, 2010, now Pat. No. 8,484,191.

(51) Int. Cl.
G06F 17/30 (2006.01)
G06Q 10/10 (2012.01)

(52) U.S. Cl.
CPC .... *G06F 17/30864* (2013.01); *G06F 17/30867* (2013.01); *G06Q 10/10* (2013.01)

(58) Field of Classification Search
CPC ................. G06F 17/30011; G06F 17/30861; G06F 17/30058
USPC ........................... 707/710, 706, 739, 759, 770
See application file for complete search history.

(56) References Cited

U.S. PATENT DOCUMENTS

| 6,327,586 | B1 | 12/2001 | Kisiel |
| 7,031,961 | B2 | 4/2006 | Pitkow et al. |
| 7,089,237 | B2 | 8/2006 | Turnbull et al. |
| 7,219,130 | B2 | 5/2007 | Kumar et al. |
| 7,359,894 | B1 | 4/2008 | Liebman et al. |
| 7,606,865 | B2 | 10/2009 | Kumar et al. |
| 7,657,523 | B2 | 2/2010 | Ebanks |
| 7,765,259 | B2 | 7/2010 | MacVarish |
| 7,827,165 | B2 | 11/2010 | Abernethy et al. |
| 7,827,176 | B2 | 11/2010 | Korte et al. |
| 7,966,325 | B2 | 6/2011 | Singh |
| 7,991,764 | B2 * | 8/2011 | Rathod ........................ 707/713 |
| 8,015,058 | B2 | 9/2011 | Fowler et al. |
| 8,015,119 | B2 | 9/2011 | Buyukkokten et al. |
| 8,019,743 | B2 | 9/2011 | Ebanks |
| 8,027,943 | B2 | 9/2011 | Juan et al. |
| 8,055,788 | B1 | 11/2011 | Chan et al. |
| 8,195,656 | B2 | 6/2012 | Grasset |
| 8,266,098 | B2 | 9/2012 | Hu et al. |
| 8,266,154 | B2 | 9/2012 | Guo et al. |
| 8,320,746 | B2 | 11/2012 | Barrett et al. |
| 8,359,276 | B2 | 1/2013 | Zhuang et al. |
| 8,484,191 | B2 * | 7/2013 | Maghoul et al. .............. 707/707 |
| 8,489,586 | B2 | 7/2013 | Korte et al. |
| 8,495,058 | B2 | 7/2013 | Kulick et al. |
| 8,560,605 | B1 | 10/2013 | Gyongyi |
| 8,606,776 | B2 | 12/2013 | Steiner |

(Continued)

*Primary Examiner* — Frantz Coby
(74) *Attorney, Agent, or Firm* — Fish & Richardson P.C.

(57) ABSTRACT

Example methods, apparatuses, or articles of manufacture are disclosed that may be implemented using one or more computing devices to facilitate or otherwise support one or more processes or operations in connection with performing information searches, such as, for example, domain-specific on-line searches using social survey-type queries.

20 Claims, 3 Drawing Sheets

(56) References Cited

U.S. PATENT DOCUMENTS

| | | |
|---|---|---|
| 8,626,835 B1 | 1/2014 | Gyongyi et al. |
| 8,676,833 B2 * | 3/2014 | Chunilal ............... 707/769 |
| 8,688,704 B1 | 4/2014 | Horling et al. |
| 8,825,639 B2 | 9/2014 | Dynin |
| 8,825,644 B1 | 9/2014 | Crichton et al. |
| 8,825,698 B1 | 9/2014 | Gong et al. |
| 2005/0177385 A1 | 8/2005 | Hull et al. |
| 2007/0250483 A1 | 10/2007 | Blue et al. |
| 2008/0059455 A1 | 3/2008 | Canoy et al. |
| 2008/0228776 A1 | 9/2008 | Weiss et al. |
| 2008/0255977 A1 | 10/2008 | Altberg et al. |
| 2008/0275846 A1 | 11/2008 | Almos |
| 2009/0187537 A1 | 7/2009 | Yachin et al. |
| 2009/0204598 A1 | 8/2009 | Crane et al. |
| 2009/0204599 A1 | 8/2009 | Morris et al. |
| 2009/0204601 A1 | 8/2009 | Grasset |
| 2009/0271247 A1 | 10/2009 | Karelin et al. |
| 2010/0082398 A1 | 4/2010 | Davis et al. |
| 2010/0082593 A1 | 4/2010 | Singh |
| 2010/0094869 A1 | 4/2010 | Ebanks |
| 2010/0153371 A1 | 6/2010 | Singh |
| 2011/0035329 A1 | 2/2011 | Delli Santi et al. |
| 2011/0071843 A1 | 3/2011 | Gilvar et al. |
| 2011/0078584 A1 | 3/2011 | Winterstein et al. |
| 2011/0106895 A1 | 5/2011 | Ventilla et al. |
| 2011/0145279 A1 * | 6/2011 | Chunilal ............... 707/769 |
| 2011/0145570 A1 | 6/2011 | Gressel et al. |
| 2011/0191371 A1 | 8/2011 | Elliott |
| 2011/0218846 A1 * | 9/2011 | Fieldman et al. ......... 705/14.16 |
| 2011/0320423 A1 | 12/2011 | Gemmell et al. |
| 2012/0066202 A1 | 3/2012 | Hatazawa et al. |
| 2012/0078884 A1 | 3/2012 | Callari et al. |
| 2012/0150955 A1 | 6/2012 | Tseng |
| 2013/0110805 A1 | 5/2013 | Korte et al. |
| 2013/0110865 A1 | 5/2013 | Preetham et al. |
| 2013/0117301 A1 | 5/2013 | Horling et al. |
| 2013/0173725 A1 | 7/2013 | Ventilla et al. |
| 2013/0332479 A1 | 12/2013 | Liu et al. |
| 2013/0346077 A1 | 12/2013 | Mengibar et al. |
| 2014/0101193 A1 | 4/2014 | Dorohonceanu et al. |
| 2014/0122584 A1 | 5/2014 | Gargi et al. |
| 2014/0188857 A1 | 7/2014 | Steiner |
| 2014/0222577 A1 * | 8/2014 | Abhyanker ............... 705/14.58 |

* cited by examiner

ON-LINE SOCIAL SEARCH

BACKGROUND

1. Field

The present disclosure relates generally to search engine information management and, more particularly, to on-line social searching or surveying techniques.

2. Information

The Internet is widespread. The World Wide Web or simply the Web, provided by the Internet, continues to grow rapidly, at least in part, from new information seemingly being added daily. A wide variety of on-line information, such as, for example, web pages, text documents, images, audio files, video files, or the like, is continually being identified, located, retrieved, accumulated, stored, or communicated. With a large amount of information being available over the Internet, a number of tools or services may often be provided to users so as to allow for copious amounts of information to be searched through in an efficient or effective manner. For example, service providers may allow users to search the Web or other like networks using search engine information management systems or search engines. In certain instances, search engines may enable a user to search the Web by inputting one or more search terms or queries so as to try to locate or retrieve information that may be relevant or useful to such a user.

BRIEF DESCRIPTION OF THE DRAWINGS

Non-limiting and non-exhaustive aspects are described with reference to the following figures, wherein like reference numerals refer to like parts throughout the various figures unless otherwise specified.

DETAILED DESCRIPTION

Figure 1:
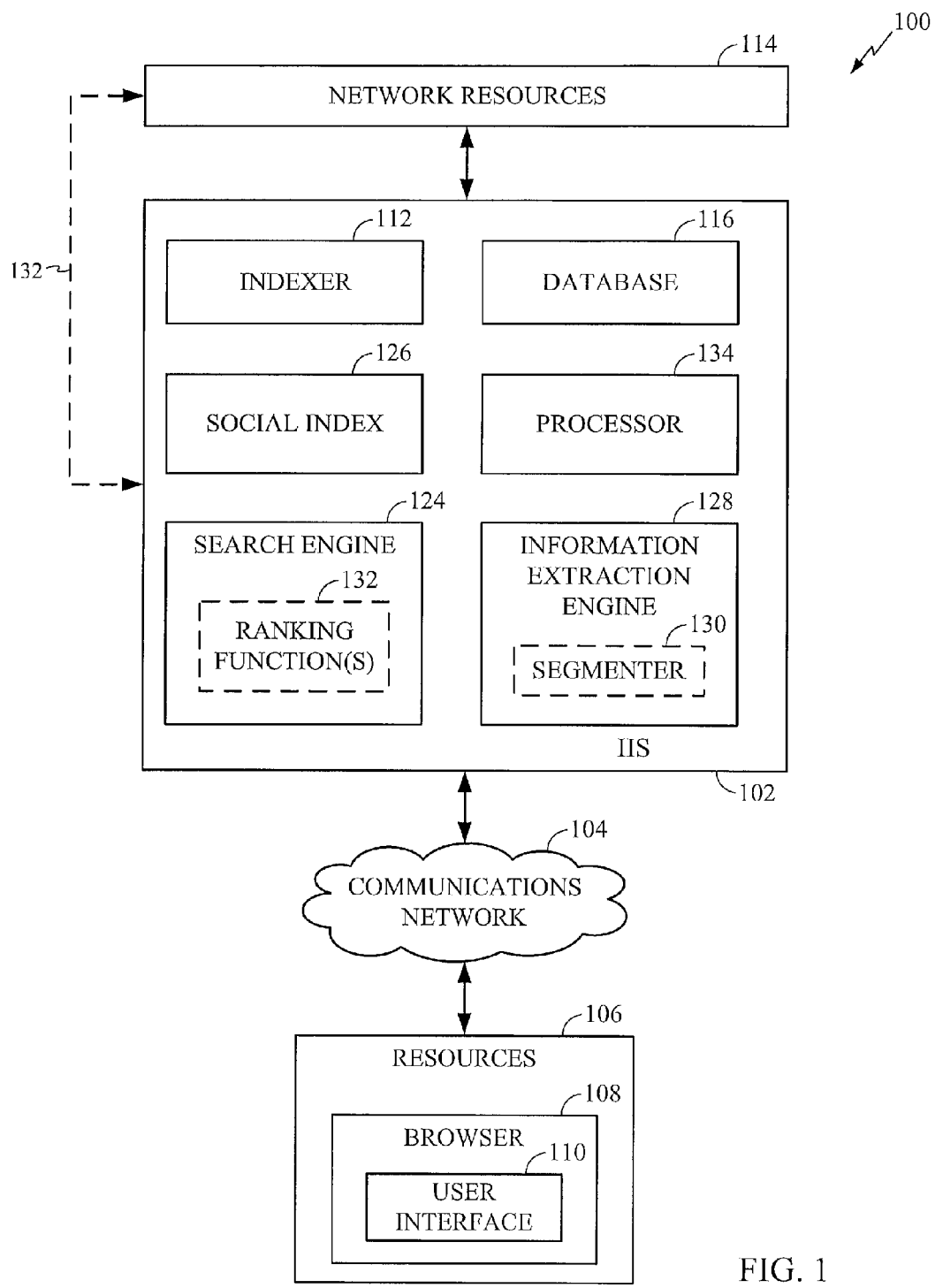
FIG. 1 is a schematic diagram illustrating an implementation of an example computing environment.

In the following detailed description, numerous specific details are set forth to provide a thorough understanding of claimed subject matter. However, it will be understood by those skilled in the art that claimed subject matter may be practiced without these specific details. In other instances, methods, apparatuses, articles, systems, etc. that would be known by one of ordinary skill have not been described in detail so as not to obscure claimed subject matter.

Some example methods, apparatuses, or articles of manufacture are disclosed herein that may be implemented, partially, dominantly, or substantially, to facilitate or support one or more processes or operations in connection with performing information searches, such as, for example, on-line searches using social survey-type queries. Typically, although not necessarily, "on-line" may refer to a type of a process, operation, technique, etc. of electronic communications that may be implemented or otherwise supported, at least in part, using one or more communications networks, such as, for example, the Internet, one or more intranets, one or more communication device networks, or the like. Communications networks may comprise, for example, any suitable or desired wireless network, wired network, or any combination thereof. In the context of on-line information searches, a social search may refer to information searching in which relevance of search results may, for example, be determined, at least in part, by taking into account or considering social content associated with one or more social networks, networking parties, etc. or one or more social features or attributes associated with one or more social networks, networking parties, etc. Here, for example, a networking party, such as one or more users, members, etc. associated with one or more social networks, may create, originate, etc. social content in the form of status updates, rating or review posts, news feeds, tweets, or the like and may post or communicate social content within one or more applicable social networks. As will be seen, one or more social features or attributes of these users, members, etc., such as demographics, political views, religious beliefs, locations, or the like may be utilized, at least in part, to account for relevance, filtering, etc. of social content in connection with on-line information searches.

As used herein, the terms "social survey-type query," "social survey query," or simply "query" may be used interchangeably and may refer to one or more search terms a user, member, or client may specify or employ with a search engine to retrieve social information accounting for one or more social aspects or features of one or more members of a social network of a user initiating or specifying the query. For example, a search engine user may specify or input a query via a use case so as to retrieve on-line information that may typically, although not necessarily, be personalized or opinion-based, such as ratings, reviews, news feeds, etc. having social relevance to such a user, as described below. Use cases may generally refer to a form of user scenarios related to a particular goal that may be formulated in terms of a task specifying details with respect to such a goal within a particular environment. By way of example, a use case may be formulated into a query by entering or inputting a phrase "What local deals have been liked by my friends in my city in the last day?" into a search engine via an interface, though claimed subject matter is not so limited. Certain aspects of formulated use cases will be described in greater detail below. As will be seen, social survey queries may, for example, be advantageously utilized to retrieve or otherwise obtain socially relevant information in the form of personalized or tailored social survey results or interactive responses from one or more members of a social network or a user issuing a query. As such, by accounting for or considering a specific or particular connection (e.g., dialog-type, etc.) between a user issuing a query and a user's social network, human intelligence or input may be leveraged with a social component resulting in locating, retrieving, providing, etc. information, which otherwise may not be available via a traditional on-line information search.

Generally, in this context, "social graph" or "social network" may be used interchangeably and may refer to a social grouping or arrangement established or existing via a communications network, for example, such as a web-based network or virtual community of social relationships communicating or sharing information by posting social content via a suitable communications network. In some cases, a social network may be represented via a pattern of relationships in the form of associational ties or links between interconnected nodes (e.g., users, members, etc.). Social relationships between users, members, etc. of a social network may, for example, be based, at least in part, on various types of interdependency, such as friendship, kinship, common interests, activities, events, relationships of workplace, geographic location, religious beliefs, etc., though claimed subject matter is not so limited.

A social network may comprise, for example, a public social network, a private social network, or any combination thereof. For example, a public social network may generally refer to a social network in which social content (e.g., status updates, contacts, posts, messages, etc.) may be visible to or shared among users, members, etc. of the network or may otherwise be publicly accessible. A private social network may, for example, refer to a social network in which social content may be visible to or shared among only certain users, members, etc. (e.g., close friends, family, etc.) of the network or as permitted by these users, members, etc., or social networking service. As will be seen, at times, a social network may comprise, for example, one or more sub-networks or sub-graphs, which may also be private, public, or comprise any combination thereof. As a way of illustration, social networks may include Facebook, MySpace, LinkedIn, Yelp, XING, Twitter, Jaiku, Tumblr, Plurk, Beeing, just to name a few examples. Of course, such details relating to social networks are merely examples, and claimed subject matter is not so limited. It should be noted that example methods, apparatuses, or articles of manufacture disclosed herein may be implemented in connection with or otherwise supported by any social network, such as, for example, one or more social networks mentioned above, as well as those not listed or to be developed in the future.

Following the above discussion, as a way of illustration, some examples of various use cases formulated into social survey queries that may be used for on-line information searches may include those shown in Table 1 below. As seen, on-line social searches in connection with queries 1 through 6 may be tailored to or directed towards particular social content, such as, for example, one or more domain-specific private sub-graphs. As the term used herein, "domain-specific" may refer a particular grouping, aspect, field, set, property, concept, level, etc. associated with a social network of a user issuing a query, such as, for example, a particular sub-graph. Here, for example, a user may tailor or direct a query towards a particular grouping or sub-graph, such as "my Facebook friends" in Query 1, "my Indian friends" in Query 2, "my democrat friends" in Query 3, "my friends in Florida" in Query 5, etc. As also illustrated, optionally or alternatively, social searches may be performed with respect to public content using, for example, social survey queries tailored to or directed towards one or more specific domains, such as the public domain of "everyone living in London" (e.g., in Query 7), of "spas in my city" (e.g., in Query 8), or of "men older than 30 in Boston" (e.g., in Query 9). Of course, social survey queries illustrated in Table 1 are merely examples, and claimed subject matter is not limited in this regard.

TABLE 1

Example social survey queries.

1. "What did my Facebook friends think of Prince of Persia, the movie"
2. "What is an Indian restaurant in Sunnyvale, CA, that my Indian friends check into/liked in the last 6 months"
3. "What did my democrat friends think of Obama's healthcare reform bill"
4. "What smartphone do most of my friends comment positively about"
5. "What do my friends in Florida think of the oil spill in the Gulf"
6. "What local deals have been liked by my friends in my city in the last day"
7. "What are all the updates by everyone living in London in the last 6 hours"
8. "What are all the deals posted by spas in my city on Twitter this past weekend"
9. "What are all Irish bar reviews by men older than 30 in Boston"

As was indicated, effectively or efficiently identifying or locating social content on the Web may facilitate or support information-seeking behavior of users, members, etc., for example, leading to an increased usability of a search engine. As such, due to, at least in part, the popularity of social networking, a search engine may, for example, wish to include social content in a listing of returned search results. Typically, although not necessarily, social content may include ratings, reviews, news feeds, comments, posts, or the like, some or most of which may have a special, personal or otherwise applicable relevance to a user issuing a query, the concept, which may be referred to, at least in part, as social relevance. As used herein, the term "social relevance" is to be interpreted broadly and may refer to a measure of how pertinent particular social content (e.g., located, retrieved, ranked, etc.) is to a specific user, member, etc., such as, for example, a user issuing a query, a specific member(s) of a particular social network, etc. As will be seen, in certain implementations, social relevance may be represented, for example, as a quantitative or qualitative evaluation of social content (e.g., a social relevance or ranking score, etc.) that may be based, at least in part, on one or more social aspects or features of member(s) of a social network and a relation of such one or more aspects or features of such member(s) to a social survey query or a user issuing such a query. For example, social relevance may account for or otherwise consider one or more social aspects or features associated with a user issuing a query, such as a measure of user social authority across the user's social network, traits or similarities of a user to the user's on-line "social circle," or other user-related information that may be available or known about the user. To illustrate, a measure of user social authority across the user's social network may be based, at least in part, on a number of social friends, followers, etc. that the user has within the user's network, as one possible example. Certain contextual or temporal information based, at least in part, on keyword relevance, for example, as well as recency of social content (e.g., postings chronology, etc.) with respect to a user issuing a query as well as the query itself, respectively, may also be considered. In certain situations, social user-related information may be extracted or acquired, for example, from a user's social profile associated with the user's network account, as will also be seen. Of course, such details are intended as merely examples, and claimed subject matter is not so limited.

As was indicated, social communication arrangements supported by the Internet, such as, for example, on-line social networks, web-based virtual communities, etc. continue to evolve. On-line social content in the form of, for example, news feeds, blogs, portals, status updates, rating or review posts, tweets, or the like may be shared by community members across one or more on-line social networks and, at times, openly published on the Web. Social networking is gradually becoming more widespread due to, at least in part, its convenience, immediacy, portability, appeal, etc., for example, thus, increasing a utility of information posted or transmitted by on-line social networking community. As such, a search engine may wish to include on-line social content in a listing of search results returned in response to a query. However, how to locate, retrieve, or rank on-line information in terms of social relevance to a user, for example, continues to be an area of development.

Today, a number of search engines are capable of returning social content indexed, cached, or otherwise gathered, for example, by real-time or near real-time, streaming in, sampling, crawling, or otherwise monitoring one or more sources of social information (e.g., via subscription feeds, streaming information feeds, etc.) across one or more social networks. As used herein, "real time" may refer to amount of timeliness of content or information, which has been delayed by an amount of time attributable to electronic communication as well as other information processing. Typically, although not necessarily, search engines may return socially relevant content by identifying, for example, popular or news-worthy contextual attributes of a particular query and feeding or funneling such attributes to or otherwise searching a public stream of popular or news-worthy social content as it becomes available (e.g., published on the Web, posted on a social network, etc.). As such, social search engines typically, although not necessarily, may integrate popular or news-worthy social content into keyword-related social searches using, for example, information streams in the form of public updates from social networking sites, such as Twitter, MySpace, Facebook, or the like. Thus, in certain instances, a search may remain agnostic with respect to where information is being streamed from, for example, and may focus mainly on objectives of presenting a suitable or desired combination of real-time, relevant, or context-aware social information. In addition, at times, social search engines may be overwhelmed with real-time or live information streams from a number of information sources, which may affect or impair an ability to filter or recognize and, thus, suitably rank socially relevant content. For example, search engines overwhelmed with a live stream of social content may be more prone to content misclassifications resulting in locating, retrieving, ranking, etc. irrelevant, less relevant, or otherwise unwanted social content, such as spam, self-promotion, etc. Accordingly, it may be desirable to develop one or more methods, systems, or apparatuses that may account for or otherwise consider social content that may have a special, personal, or otherwise applicable relevance to a particular user, member, etc. so as to improve or otherwise positively affect ranking, filtering, etc. in the context of on-line information searches.

As will be described in greater detail below, a social survey query may be formulated or otherwise specified by a user, member, or client associated with one or more on-line social networks, for example, and may be electronically processed in some manner using suitable or desired techniques, such as pattern-matching, language-modeling, or the like so as to arrive at or generate a number of component parts or query entities. As used herein, "entity" may refer to one or more lexical objects, such as words, sentences, phrases, etc. descriptive of or otherwise associated with one or more electronic documents representing on-line social content that may be matched (e.g., mapped, etc.) or otherwise semantically correspond to one or more query terms or keywords based, at least in part, on one or more suitable query matching techniques. Although claimed subject matter is not limited in this regard, entities may comprise, for example, particular restaurants, local deals, locations, user or member actions, etc., which may correspond to one or more facets occurring or co-occurring with entities within the vocabulary of one or more on-line social information sources, as will be seen. A vocabulary may comprise, at least in part, a number of lexical objects associated with a particular information source, such as one or more news feeds, articles, status updates, databases, or like collection of social information, just to name a few examples.

"Facet" may refer to one or more lexical objects representative of one or more concepts, aspects, properties, attributes, or characteristics of an entity. In some cases, a facets may be defined, for example, via a directed relationship between an entity e and a facet f, such as, for example, in a faceted relationship or relation (e, f). A plurality of facets may be related to a particular entity via a number of faceted relations, such as, for example, subordinate, subsumed, associational, dependent, curative, hierarchical, etc. By way of example, the location entity "London" may be related to a large number of facets, such as "Big Ben," "London Eye," "Tower Bridge," "British Museum," "Trafalgar Square," etc. through a subsumed "city—landmarks" relation (e.g., London—Big Ben, London—Tower Bridge, etc.). In addition to subsumed relations, an entity may also have a number of associational or suggestive relations with facets. As a way of illustration, the entity "Venice" may be associated, for example, with or suggestively related to a number of facets, such as "museums," "hotels," "wine tasting," "carnival," "sightseeing," gondolas," "graffiti," "film festival," etc. via a "location—event/activity" relation. Of course, these are merely examples, and claimed subject matter is not so limited.

Thus, in one particular implementation, a social survey query may be processed in some manner and may be applied to or executed across one or more on-line social networks or any part of on-line social networks (e.g., sub-graphs, etc.), for example, to perform a faceted or facet-like social search. Here, a faceted or facet-like social search may comprise, for example, an information search in which one or more facets (e.g., keyword-based restaurant names, etc.) may be identified or captured in an applicable domain-specific (e.g., Irish bars in Boston, etc.) on-line social content (e.g., user or member reviews, ratings, opinions, comments, etc.). Of course, these details relating to faceted or facet-like searches are merely examples, and claimed subject matter is not limited in this regard. Faceted or facet-like searches are known and need not be described here in greater detail.

Accordingly, following the above discussion, domain-specific social content (e.g., rating or review postings, comments, status updates, etc.) as well as user or member-related attributes or features (e.g., demographics, interests, locations, etc.) associated with applicable on-line social networks, for example, may be located and advantageously employed in connection with one or more social components of a query represented by one or more entities. For example, in an implementation, based, at least in part, on particularities of social context of a query or so-called query "socialness," a faceted search may be performed, at least in part, by routing or directing towards or otherwise applying social components of such a query across one or more domain-specific sources of social information. As previously mentioned, a social survey query may be routed or directed towards a specific domain, such as the private social sub-graph of "my friends in Florida" or "my immediate family," for example, thus, sufficiently personalizing or tailoring search results to a particular user, member, etc. so as to positively affect or improve social relevance, ranking, filtering, or the like. Again, these details are merely examples to which claimed subject matter is not limited.

As will be seen, certain social aspects or features of a user issuing a query as well as user-related content associated with a particular social network may be taken into account or otherwise considered. Social aspects or user-related content may be utilized, for example, by an indexer or like process or function to establish or maintain a social index or like collection of information (e.g., a cache, etc.) accessible by a ranking function, just to illustrate one possible implementation. Certain social information associated with an index or cache may be used, for example, by a ranking function to compute social relevance or ranking scores determining a particular order of search results based, at least in part, on one or more aspects or features reflecting social relevance of a query to a user, member, etc. For example, social ranking may be based, at least in part, on explicit social relevance to a user issuing a query, implicit social relevance to such a user, or any combination thereof. Typically, although not necessarily, explicit social relevance may be determined, at least in part, from a query itself (e.g., via keywords, entities, etc.), and implicit social relevance may be determined, at least in part, from user-related information not explicitly specified by a query. As a way of illustration, explicit social relevance may comprise, for example, a user-specified domain, sub-graph, gender, age, etc. Implicit social relevance may comprise, for example, a current location of a user determined via a media access control (MAC) address by a location-aware smart phone of the user, by way of another illustration. Results of ranking may be implemented, partially, dominantly, or substantially, for use with a search engine or other information management systems, for example, responsive to search queries, social survey-type or otherwise, though claimed subject matter is not so limited.

Before describing some example methods, apparatuses, or articles of manufacture in greater detail, sections below will first introduce certain aspects of an example computing environment in which information searches, social or otherwise, may be performed. It should be appreciated, however, that techniques provided herein as well as claimed subject matter are not limited to this example implementation. For example, techniques provided herein may be used in a variety of information processing environments, such as social database applications, language processing or modeling applications, or the like, such as may be implemented by a special purpose computing device, though claimed subject matter is not so limited. In addition, any implementations, embodiments, or configurations described herein as "example" are described primarily for purposes of illustration and are not to be construed as preferred or desired over other implementations, embodiments, or configurations.

The Internet comprises a worldwide system of computer networks and is a public, self-sustaining facility that is accessible to tens of millions of people worldwide. Currently, the most widely used part of the Internet appears to be the World Wide Web, or simply the Web, which may be considered an Internet service organizing information via use of hypermedia (e.g., embedded references, hyperlinks, etc.). Considering the large amount of resources available on the Web, it may be desirable to employ a search engine to help locate or retrieve relevant or useful information, such as, for example, one or more documents of a particular subject or interest. A "document," "web document," or "electronic document, as the terms used herein, are to be interpreted broadly and may include one or more stored signals representing any source code, text, image, audio, video file, or like information that may be read or processed in some manner by a special purpose computing platform and may be played or displayed to or by a user, member, or client. Documents may include one or more embedded references or hyperlinks to images, audio or video files, or other documents. For example, one type of reference that may be embedded in a document and used to identify or locate other documents may comprise a Uniform Resource Locator (URL). As a way of illustration, documents may include a news feed, a rating or review post, a status update, a portal, a blog post, a tweet, an e-mail, a text message, an Extensible Markup Language (XML) document, a web page, a media file, a page pointed to by a URL, just to name a few examples.

In the context of information searches, social or otherwise, a query may be submitted via an interface, such as a graphical user interface (GUI), for example, by entering certain words or phrases to be queried, and a search engine may return a search results page, which may include a number of documents typically, although not necessarily, listed in a particular order. Under some circumstances, it may also be desirable for a search engine to utilize one or more techniques or processes to rank documents so as to assist in presenting relevant or useful search results in an efficient or effective manner. Accordingly, a search engine may employ one or more functions or operations to rank documents estimated to be relevant or useful (e.g., more recent, etc.) based, at least in part, on relevance scores, ranking scores, or some other measure such that more relevant or useful documents may be presented or displayed more prominently among a listing of search results (e.g., more likely to be seen by a user, member, etc.). Typically, although not necessarily, for a given query, a ranking function may determine or calculate a relevance score, ranking score, etc. for one or more documents by measuring or estimating relevance of one or more documents to a query. In the context of a social search, a ranking function may also account for or otherwise consider certain social aspects or features of a user issuing a query, for example, as well as public or private content associated with a particular domain, as previously mentioned.

As used herein, a "relevance score" or "ranking score" may refer to a quantitative or qualitative evaluation of a document based, at least in part, on one or more aspects or features (e.g., social, etc.) of that document with respect to a user issuing a query as well as a relation of these aspects or features to a query (e.g., keyword relevance, recency, etc.). A relevance or ranking score may comprise, for example, one or more signal sample values (e.g., on a pre-defined scale) calculated electronically or otherwise assigned to a document and may be used, partially, dominantly, or substantially, to rank documents with respect to a query, social survey-type or otherwise. It should be noted, however, that these are merely illustrative examples relating to relevance or ranking scores, and that claimed subject matter is not so limited. Following the above discussion, in processing a query, a search engine may place documents that are deemed to be more likely to be relevant or useful (e.g., with higher relevance scores, ranking scores, etc.) in a higher position or slot on a returned search results page, and documents that are deemed to be less likely to be relevant or useful (e.g., with lower relevance scores, ranking scores, etc.) may be placed in lower positions or slots among search results, for example. A user, member, etc., thus, may receive and view a web page or other electronic document that may include a listing of search results presented, for example, in decreasing order of social relevance, just to illustrate one possible implementation. As will also be seen, search results may reflect, in whole or in part, a recency or freshness of a document, for example, meaning that documents may be ranked based, at least in part, on an order in which documents are published or posted (e.g., on the Web, social networking web site, rating or review portal, etc.).

With a large amount of information being added to the Web daily, particularly social networking information, for example, maintaining an up-to-date index via a crawl may be a challenging or computationally expensive task. Typically, although not necessarily, a crawler may perform a new crawl or update an index of documents periodically. Constraints, such as size of the Web, cost or finite nature of bandwidth for conducting crawls, especially of deep Web resources, for example, may contribute to slower network scan rates. Accordingly, in an implementation, one or more real-time or near real-time indexing or caching techniques may be utilized, for example, to return socially relevant or useful information in response to a query. As a way of illustration, certain search engines may facilitate or support quicker indexation, for example, by streaming in or monitoring on-line content at, upon, or soon after its posting or publication (e.g., via streaming or subscription feeds, application programming interface (API) updates, etc.) such that social content may be found while it may still be considered relevant or useful. Of course, these are merely details relating to real-time or near real-time indexing or caching techniques, and claimed subject matter is not limited in this regard.

Attention is now drawn to FIG. 1, which is a schematic diagram illustrating certain features of an implementation of an example computing environment 100 capable of facilitating or supporting, in whole or in part, one or more processes or operations in connection with performing information searches, such as, for example, on-line searches using social survey-type queries. Example computing environment 100 may be operatively enabled using one or more special purpose computing apparatuses, information communication devices, information storage devices, computer-readable media, applications or instructions, various electrical or electronic circuitry and components, input signal information, etc., as described herein with reference to particular example implementations.

As illustrated in the present example, computing environment 100 may include one or more special purpose computing platforms, such as, for example, an Information Integration System (IIS) 102 that may be operatively coupled to a communications network 104 that a user, member, or client may employ in order to communicate with IIS 102 by utilizing resources 106. Resources 106 may comprise, for example, one or more special purpose computing devices or platforms. It should be appreciated that IIS 102 may be implemented in the context of one or more information management systems associated with public networks (e.g., the Internet, the World Wide Web) private networks (e.g., intranets), public or private search engines, Real Simple Syndication (RSS) or Atom Syndication (Atom)-based applications, etc., just to name a few examples.

Resources 106 may comprise a desktop computer, mobile device, personal digital assistant, etc., for example, capable of communicating with or otherwise having access to the Internet via a wired or wireless communications network. Resources 106 may include a browser 108 and a user interface 110, such as a graphical user interface (GUI), for example, that may initiate transmission of one or more electrical digital signals representing a query. Browser 108 may facilitate access to or viewing of documents via the Internet, for example, such as HTML web pages, pages formatted for mobile devices (e.g., WML, XHTML Mobile Profile, WAP 2.0, C-HTML, etc.), or the like. User interface 110 may interoperate with any suitable input device (e.g., keyboard, mouse, touch screen, digitizing stylus, etc.) or output device (e.g., display, speakers, etc.) for interaction with resources 106. It should be noted that even though a certain number of resources 106 are illustrated in FIG. 1, it should be appreciated that any number of resources may be operatively coupled to IIS 102 via, for example, any suitable communications network, such as communications network 104, for example.

In one particular implementation, IIS 102 may include one or more digital signal information indexing or crawling mechanisms, represented generally by an indexer 112, capable of accessing network resources 114. Indexer 112 may store all or part of located documents (e.g., URLs, etc.) in a database 116, for example. IIS 102 may further include a search engine 124 supported by a suitable index or cache represented herein, for example, by a social index 126, just to illustrate one possible implementation. Search engine 124 may be operatively enabled to search for information associated with network resources 114. For example, search engine 124 may communicate with user interface 110 and may retrieve for display via resources 106 a listing of socially relevant search results associated with social index 126 in response to one or more digital signals representing a social survey query, though claimed subject matter is not so limited.

Network resources 114 may include any organized collection of any type of information, for example, represented by binary digital signals accessible over the Internet or associated with an intranet (e.g., documents, web sites, databases, discussion forums, ration or review posts, etc.). As was indicated, in certain implementations, network resources 114 may include private or public social content (e.g., social networks, graphs, sub-graphs, etc.) as well as one or more user or member-related social features or attributes. It should be noted that, optionally or alternatively, one or more user or member-related features or attributes (e.g., demographic information, MAC addresses or session locations, etc.) may be stored within IIS 102, for example, in the form of binary digital signals in database 116 or social index 126, though claimed subject matter is not so limited, of course.

In certain implementations, information associated with social index 126 may be generated by an information extraction engine 128 based, at least in part, on located or extracted content associated, for example, with one or more information sources (e.g., domain-specific social graphs, sub-graphs, etc.) during indexing, caching, crawling, etc, just to illustrate one possible implementation. As seen in this example, information extraction engine 128 may further include or otherwise be operatively coupled to a segmenter 130 capable of facilitating or supporting one or more processes or operations in connection with query parsing, segmentation, mapping, etc. using one or more suitable or desired techniques (e.g., pattern-matching, language modeling, etc.). One or more processes or operations in connection with query parsing, segmentation, etc. will be described in greater detail below with reference to Table 3.

As was indicated, it may be advantageous to utilize one or more real-time indexing or caching techniques or processes, for example, to keep social index 126 sufficiently updated with socially relevant on-line content. To illustrate, IIS 102 may be operatively enabled to subscribe, for example, to one or more social networking platforms or services via a streaming information feed, such as a live or direct feed, as indicated generally by dashed line at 132. In one particular implementation, IIS 102 may be enabled to subscribe to the Twitter streaming application programming interface (API) or Twitter "firehose" feed, for example, thus, having social content streamed in real time or near real time so as to facilitate or support more effective or efficient searching, indexing, caching, archiving, etc., for example. As will be described in greater detail below, in certain implementations, on-line social content (e.g., searched, indexed, cached, archived, etc.), for example, from two or more information sources may be joined in some manner so as to enhance social relevance of search results. For example, IIS 102 may be enabled to recognize that two (or more) ratings or reviews with respect to the same entity (e.g., a specific restaurant, etc.) that were streamed in, indexed, cached, or otherwise acquired from two (or more) different social networking web sites (e.g., Twitter and Facebook, etc.) actually came from the same user, member, etc. and, as such, may be advantageously utilized in connection with a domain-specific search across multiple social networks. In this illustrated example, such ratings or reviews may be joined together based, at least in part, on a common identifier (e.g., name, e-mail address, physical location, etc.) with respect to such a user, member, etc. In addition, social information may be joined, for example, in instances where a query may be sufficiently general in nature so as to apply across multiple social networks, sub-graphs, etc., thus, enhancing social relevance of search results (e.g., accounting for or considering more reviews, ratings, feedbacks, opinions, surveys, etc.). Of course, these are merely examples to which claimed subject matter is not limited.

As previously mentioned, it may be desirable for a search engine to employ one or more operations or processes to rank search results so as to assist in presenting relevant or useful information in response to a query. Accordingly, IIS 102 may employ one or more ranking functions, indicated generally by dashed lines at 132, to rank search results in an order that may, for example, be based, at least in part, on a social relevance, posting or publishing chronology, etc, just to illustrate a few possible implementations. For example, in one particular implementation, ranking function(s) 132 may determine a particular order of ranking based, at least in part, on one or more social aspects or features associated with a user issuing a query, such as a user's centrality or social authority across one or more social networks, sub-graphs, etc. (e.g., how many social friends, followers, etc. a user has, etc.). In another possible implementation, ranking function(s) 132 may order search results based, at least in part, on keyword relevance or, optionally or alternatively, on similarities of a user, member, etc. to the user's "social circle" (e.g., friends, co-workers, etc.), such as age, gender, or the like. Also, in certain implementations, ranking may be based, at least in part, on chronological ordering of located search results, such as, for example, freshness or recency of on-line posting or publishing, as previously mentioned. Certain aspects with respect to ranking of social information in connection with domain-specific on-line searches will be described in greater detail below with reference to FIG. 2. In one particular implementation, ranking function(s) 132 may be capable of aggregating sample relevance values (e.g., points or star-based ratings, reviews, etc.) in some manner so as to arrive at a relevance or ranking score for a document using one or more suitable or desired aggregation techniques (e.g., averaging, etc.), as will also be seen. Of course, such details are merely examples, and claimed subject matter is not limited in this regard. It should be noted that ranking function(s) 132 may be included in search engine 124 or, optionally or alternatively, may be operatively coupled to it. As illustrated, IIS 102 may further include a processor 134 that may be operatively enabled to execute special purpose computer-readable code or instructions or to implement suitable or desired operations or processes associated with example environment 100, for example.

In operative use, a user, member, or client may access a particular search engine website (e.g., www.yahoo.com, http://search.twitter.com, http://www.yelp.com, http://tweetmeme.com/search, etc.), for example, and may submit or specify a query (e.g., type into a search engine interface, etc.) by utilizing resources 106. In one particular implementation, a query may be specified or formulated by selecting a suitable or desired use case to be queried (e.g., "What did my Facebook friends think of this movie?", etc.) from a drop-down menu, for example, resulting from performing a "mouse-over" or hover-box operation (e.g., with a cursor, arrow, etc.) over a corresponding movie title on a social networking web site. Of course, this is merely one possible example relating to specifying or formulating a use case into a query, and claimed subject matter is not so limited. For example, in certain implementations, a use case may be specified or formulated into a query by highlighting or selecting a suitable or desired use case (e.g., "Which new dinner entrées have been recommended by my Indian friends in the last month?", etc.) from partially transparent options (e.g., a drop-down list, check boxes or radio buttons, tab panel, etc.) overlaying a web page with a particular subject of interest (e.g., a home page of a specific restaurant, etc.), just to illustrate another non-limiting example. Browser 108 may initiate communication of one or more electrical digital signals representing a query from resources 106 to IIS 102 via communications network 104. IIS 102 may access or look up a cache or social index 126 and establish a listing of documents based, at least in part, on an order in accordance with ranking function(s) 132, for example. IIS 102 may communicate a listing to resources 106 for displaying, for example, via user interface 110.

With this in mind, example techniques will now be described in greater detail that may be implemented, partially, dominantly, or substantially, to facilitate or support one or more processes or operations in connection with performing information searches, such as, for example, domain-specific on-line searches using social survey-type queries in an effective or efficient manner. As was indicated, example techniques presented herein may be implemented in connection with one or more social networking platforms or applications capable of executing instructions represented by digital signals. For example, in one particular implementation, example techniques may utilize, in whole or in part, a special-purpose software application residing on one or more canvas pages associated with a suitable or desired networking platform (e.g., Facebook, MySpace, etc.) but using social information indexed, cached, archived, aggregated, etc. on one or more Yahoo! servers or platforms, such as one or more Yahoo! Open Strategy (YOS) platforms. Here, for example, a search engine user or a member of a particular social network (e.g., Facebook, MySpace, etc.) may input or specify a query with respect to a particular use case (e.g., a social survey query, etc.) in a search engine interface associated with a network, and the query may be routed, directed towards, or applied in connection with a social content indexed, cached, archived, aggregated, etc. from a number of information sources (e.g., social networks, sub-graphs, etc.) on one or more YOS platforms (e.g., Yahoo! Applications Platform (YAP), Yahoo! Social Platform (YSP), etc.). As such, a particular use case may result, for example, in multiple queries advantageously applied across a number of social information sources utilizing one or more Yahoo! servers or platforms. Search results located or retrieved, for example, at YOS may be subsequently returned or displayed to a user, member, etc. at or in connection with a social network (e.g., Facebook, MySpace, etc.) of a user issuing a query. Of course, such details are merely examples, and claimed subject matter is not so limited.

In another implementation, example techniques may utilize, in whole or in part, an application integrated with an on-line search engine associated with a particular service provider, such as a YAP application, for example, residing on a suitable Yahoo!® platform (e.g., www.yahoo.com), though claimed subject matter is not so limited, of course. Here, for example, such an application may be built on top of YAP and may be utilized, partially, dominantly, or substantially, as an enhancement to currently available Updates Search YAP application, just to illustrate one possible implementation. Optionally or alternatively, domain-specific on-line social searches may be implemented using, for example, an OpenSocial application developed based, at least in part, on Yahoo! OpenSocial platform at YAP and, as such, available for distribution across any suitable web site (e.g., publisher web site, blogger web page or portal, etc.) that may support one or more suitable or desired OpenSocial functions (e.g., MySpace, etc.). In yet another implementation, example techniques may comprise, at least in part, utilizing a web site or web page (e.g., stand-alone, separate, etc.) that, in some instances, may be associated with an on-line service provider. To illustrate, a stand-alone or separate web page may comprise an on-line property or portal page at Yahoo!, for example, wherein a social search may be presented via one or more suitable or desired search engine interfaces or toolbars (e.g., via http://www.bing.com/social, etc.) featuring, for example, one or more APIs that may integrate or connect various social networks (e.g., Facebook, Yelp, etc.) into or with Yahoo! search infrastructure. Of course, these are merely examples relating to various possible implementations to which claimed subject matter is not limited.

Figure 2:
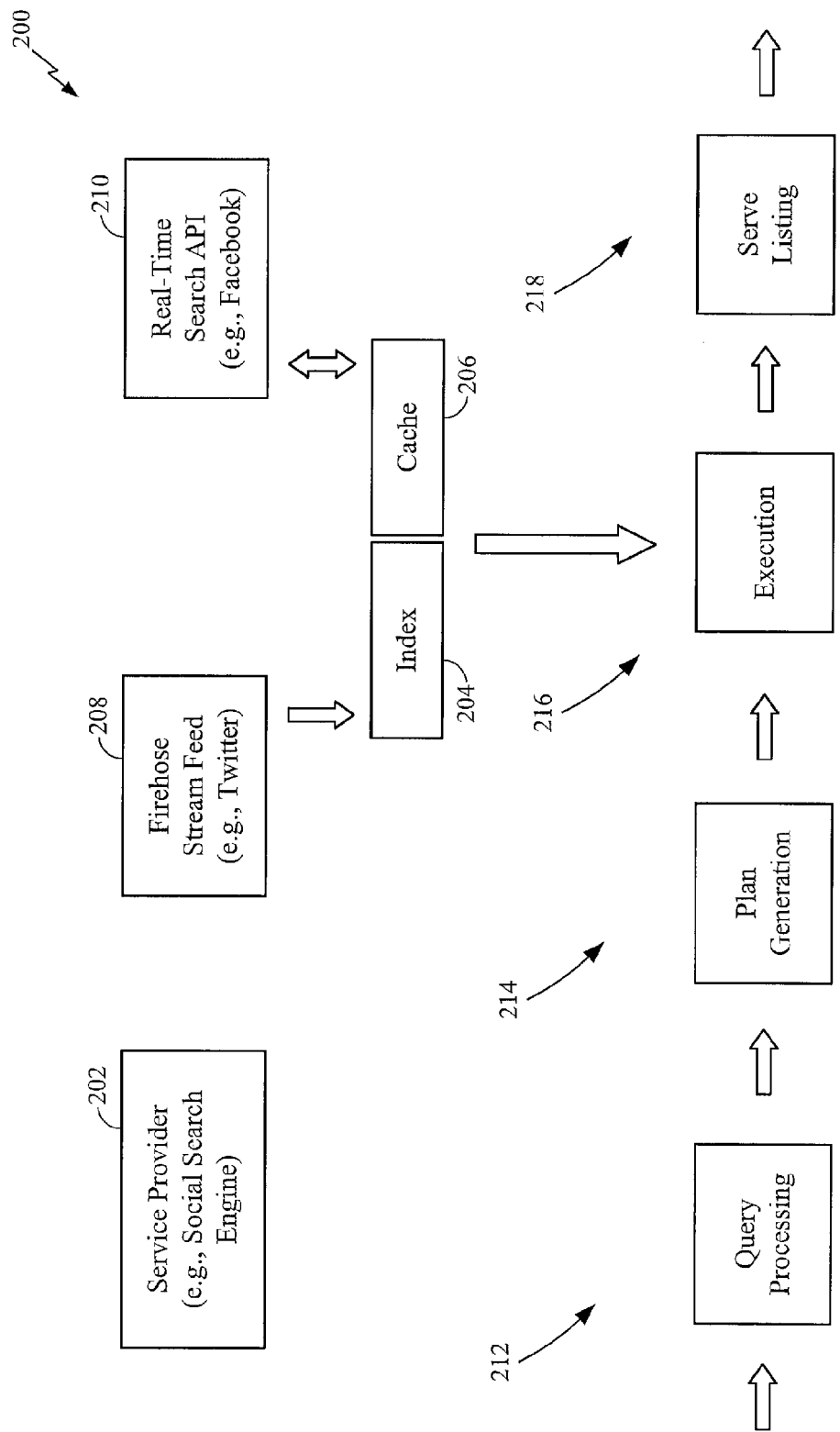
FIG. 2 is a schematic diagram illustrating a summary of an example process for on-line social information searches.

FIG. 2 is a schematic diagram illustrating a summary of an example process 200 that may be implemented, partially, dominantly, or substantially, to facilitate or support certain on-line information searches, such as, for example, domain-specific on-line searches using social survey-type queries. It should be noted that information applied or produced, such as, for example, results associated with example process 200 may be represented by one or more digital signals. It should also be appreciated that even though one or more operations are illustrated or described with respect to a certain sequence, other sequences including, for example, concurrent operations may also be employed. In addition, although the description below references particular aspects or features illustrated in certain other figures (e.g., FIG. 1, etc.), one or more operations may be performed with other aspects or features.

As seen, example process 200 may comprise, for example, a service provider, as schematically referenced at 202, associated with a suitable or desired IIS comprising a search engine, though claimed subject matter is not so limited. As previously mentioned, a search engine may be capable of obtaining socially relevant on-line information in connection with networking parties (e.g., one or more users, members, etc.) of one or more on-line social networks of a user issuing a query. For example, a social search engine associated with service provider 202 may be capable of indexing, caching, archiving, etc. on-line social content associated with one or more sources of social information (e.g., social networks, sub-graphs, etc.) using suitable or desired techniques so as to keep, for example, an index 204 or a cache 206 sufficiently updated. As seen in this illustrated example, service provider 202 may be capable of subscribing to one or more social networking platforms via a streaming information feed 208, such as the Twitter "firehose," for example, wherein social information may typically, although not necessarily, be indexed or archived for a certain period of time (e.g., a several days, weeks, months, etc.), depending, at least in part, on a subscription policy. Optionally or alternatively, social information may be queried on-demand using, for example, one or more suitable or desired stream, search, or updates APIs, such as a real-time search API (e.g., Facebook stream, Yahoo! Updates API, etc.), indicated generally at 210. Here, for example, process 200 may employ one or more suitable or desired caching techniques to facilitate or support access to real-time social information in an effective or efficient manner, as was indicated. In addition, in one particular implementation, archiving of certain on-line social information may be restricted or otherwise limited (e.g., due to restriction policies, contracts, agreements, etc.), in which case service provider 202 may be capable of or enabled to subscribe, for example, to certain updates (e.g., selected, suitable, desired, etc.) and may be notified as they occur (e.g., via MySpace publish/subscribe APIs, etc.). Of course, such details relating to indexing, caching, archiving, etc. of on-line social content are merely examples, and claimed subject matter is not limited in this regard.

As previously mentioned, in an implementation, certain on-line social content from two or more information sources, such as, for example, two or more streaming information feeds (e.g., Twitter and Facebook, etc.) may be joined based, at least in part on a common content identifier (e.g., user or member's name, e-mail address, physical address, etc.). For example, an IIS associated with service provider 202 may be capable of recognizing that a particular user, member, etc. providing a comment, review, rating, or the like in connection with a certain streaming information feed (e.g., from Twitter, etc.) is the same user, member, etc. providing a comment, review, rating, or the like in connection with another information feed (e.g., from Facebook, etc.). Accordingly, such on-line social content may be joined so as to account for or otherwise consider socially relevant information across multiple user-related domains (e.g., Twitter and Facebook social networks, sub-graphs, etc.), for example, thus, enhancing social relevance of search results. As was also indicated, on-line social information from two or more sources may be joined, for example, in instances where a query may be sufficiently general in nature so as to apply across multiple social networks, sub-graphs, etc., thus, advantageously increasing the size of a particular user-related domain as well as its applicability. Having a larger domain may, for example, enhance social relevance of search results by accounting for or considering a larger number of users, members, etc. and, thus, social surveys (e.g., reviews, ratings, opinions, etc.) with respect to a particular use case (e.g., how many users, members, etc. agree that a particular restaurant, hotel, bar, etc. is good, better, best, etc.). Of course, claimed subject matter is not limited in this regard.

In an implementation, on-line information reflecting, for example, certain social aspects or features in connection with a user, member, etc. associated with one or more social networks, sub-graphs, etc. may be accessed, extracted or otherwise collected in some manner so as to facilitate or support domain-specific on-line social searches. In certain simulations or experiments, it has been observed that a format in which user-related social information is stored (e.g., on-line, in a user or member social profile, network account, etc.) may prove to be less important than availability of certain aspects or features with respect to a particular user, member, etc., for example, so as to enable on-line social searches for use cases, though claimed subject matter is not limited to such an observation, of course. By way of example but not limitation, one possible format suitable for facilitating or supporting domain-specific on-line social searches may include one represented in Table 2 below. Thus, consider:

TABLE 2

Example social information format.

record: {
source: { name: <facebook, twitter, linkedin, buzz, yelp, imdb etc.> }
type: { name: status, comment, like, R&R, share, bookmark, pic, vid }
friend: {
    user id: user_id,
    location: woeid,
    type: user_entity_type eg. democrat or hipster,
    gender: male or female,
    age: number,
    length_of_contact: time in months eg. friends since last year
}
entity/topic: { name: <politics, prince of persia, movies, restaurants, hotels, concerts, music, britney spears etc. }

TABLE 2-continued

Example social information format.

note: CAP entity ids may be substituted
keyword: list of tokens
time: date or time eg. last six months or today or last hour
}

Here, for example, "record" may comprise any suitable or desired information that may be searchable by or in connection with a particular (e.g., current, etc.) user, member, etc. As seen, "record" may include, for example, a number of sample field values allowing for value matching based, at least in part, on a value present or realized within a particular field. It should be noted that in some instances certain field values may not be available, may be ignored, or remain unmatched, though claimed subject matter is not so limited. It should also be noted that one or more negative matches may be detected meaning that records with certain sample values may be selectively excluded (e.g., during a search, etc.), as will be seen.

Following the above discussion, a user, member, etc. may input, specify, formulate, etc. a particular use case into a query (e.g., a social survey query, etc.) in a search engine interface, for example, associated with a particular service provider using any suitable or desired techniques, such as one or more techniques described above. At operation 212, a query may be processed in some manner using one or more suitable techniques, such as, for example, one or more existing pattern-matching or language-modeling techniques. As a way of illustration, string matching processes may be used, in whole or in part, among a plurality of string matching approaches to find occurrences of a pattern within another, typically, although not necessarily, longer or larger pattern. Examples of such processes may include Karp-Rabin, Boyer-Moore, Knuth-Morris-Pratt, Real Time Matching process, etc., just to name a few; although, of course, claimed subject matter is not limited to these particular examples. It should be noted that a normalization procedure may be implemented, in whole or in part, to enhance, for example, same-value string recognition or to account for particularities of various information sources.

As another illustration, a trigram-based language-modeling technique may be utilized, for example, in connection with processing a query, which may capture one or more aspects or properties of a language (e.g., natural, artificial, constructed, formal, symbolic, etc.) based, at least in part, on one or more sample values, which may, partially, dominantly, or substantially, be attributed to or otherwise associated with a language. For example, in one particular implementation, one or more sample values may comprise, in whole or in part, one or more keywords, contextual terms, facet terms, etc. represented by one or more tokens of text present or embedded in a specified or formulated query. Language modeling techniques are known and need not be described here in greater detail.

These or other like techniques, processes, or procedures may be implemented, in whole or in part, to facilitate or otherwise support a mapping of use cases to queries at operation 212. Processes for query mapping may, for example, depend, at least in part, on type of an entity (e.g., restaurant or movie, etc.) or streaming information feed/API available. Thus, in one particular implementation, a use case may be segmented and mapped to a query via a suitable or desired parsing or segmentation-type process that may be executed, for example, against a suitable or desired index (e.g., social index 126 of FIG. 1, etc.), cache (e.g., cache 206 of FIG. 2, etc.), or available API. By way of example but not limitation, Table 3 shown below illustrates examples of query segmentations that may be taken into consideration, in whole or in part, so as to facilitate or support one or more processes or operations associated, for example, with domain-specific on-line social searches. It should be noted, however, that these are merely illustrative examples, and that claimed subject matter is not limited to particular examples shown. Techniques or processes associated with query segmentations or mapping are known and need not be described here with greater particularity.

TABLE 3

Examples of query segmentations.

1. "What is an indian restaurant in Sunnyvale, CA that my indian friends check into/like-d in the last 6 months" is segmented into a search for:
   entity type = indian restaurant, location = Sunnyvale, CA, time = last 6 months, source = all friends (*), action = checkin
2. "What local deals have been liked by my friends in my city in the last day"
   entity_type = local deals, location = <user's current location>, time = last day, action = like At operation 214, a specific or tailored plan with respect to querying or executing a particular use case (e.g., specified, formulated, etc.) represented by a social survey query, for example, across one or more social networks may be electronically generated. Here, for example, an execution may be planned based, at least in part, on one or more available sources of social information (e.g., indexed, cached, streamed in, etc.) that may be represented, for example, via sample field values, such as one or more "source" field values=<facebook, twitter, linkedin, buzz, yelp, imdb etc.> of Table 2, just to illustrate one possible implementation. It should be noted that in certain implementations an execution may be planned with results restricted to a particular time period or window (e.g., to querying a Facebook stream with a "movie" query for the period of last three months, etc.), though claimed subject matter is not so limited.

In an implementation, a plan may include, for example, recognizing an inputted query as a social survey query based, at least in part, on identifying certain patterns associated with or representative of social survey-type queries (e.g., longer queries with a social component, directed towards specific domains of public or private social users, members, etc., phrased as a survey-type question, etc.). Optionally or alternatively, a query may be identified as a social survey query by determining where such a query came from, meaning that if a particular query was issued by a Facebook user (e.g., originated from a social network, etc.) then an initial assumption may be made that such a query is of a social type. In addition, one or more contextual terms, facet terms, domain-identifying terms, or the like may be identified based, at least in part, on one or more query entities obtained, for example, as a result of query processing. For example, a specific domain to which a particular query may apply to or may be directed towards may be identified by recognizing associational attributes of query entities representative of or corresponding to a certain social graph (e.g., "my friends on Facebook," etc.), a sub-section of a social graph or sub-graph (e.g., "my Indian friends on Facebook," etc.), or the like. Optionally or alternatively, one or more processes with respect to identifying social survey-type queries or specific applicable domains may be implemented or performed separately from operation 214, such as, for example, in connection with operation 212, though claimed subject matter is not so limited, of course.

With regard to operation 216, a process may execute instructions on a special purpose computing apparatus to apply, route, or otherwise direct a query towards a specific applicable (e.g., user-related, etc.) domain, for example, taking into account or considering particularities of social context or "socialness" of such a query. For example, in an implementation, a number of fields associated with a suitable or desired record, such as a record illustrated in connection with Table 2, may be processed in some manner so as to selectively include or exclude records with certain field values (e.g., entity_type=restaurant and update_time in last 1 week, etc.), just to illustrate one possible implementation. It should be noted that corresponding field values may be aggregated in some manner using suitable aggregation techniques so as to perform one or more computations to arrive, for example, at suitable or desired statistical sample quantities, such as a single rating for multiple star-based reviews (e.g., avg(rating) or count(*), etc.), or the like. Some examples of statistical sample quantities may include an average, a median, a mean, a percentile of mean, a maximum, a sample number of instances or count, a ratio, a rate, a frequency, etc., or any combination thereof. Of course, these are merely examples, and claimed subject matter is not so limited.

In an implementation, a process may further execute instructions on a special purpose computing apparatus to rank, for example, applicable records or results received in response to one or more digital signals representing a query using one or more suitable or desired ranking functions (e.g., machine-learned, etc.). For example, a ranking function may compute a social relevance or ranking score based, at least in part, on one or more social aspects or features of a user, member, etc. of an applicable social network, or other related information obtained from one or more applicable records, as was indicated. More specifically, here, for example, ranking may be based, at least in part, on social relevance to a user issuing a query, meaning that search results may be ordered based, at least in part, on how relevant applicable record may be to such a user (e.g., ordered by user or friend authority, keyword relevance, similarities of a "social circle of friends" to a user issuing a query, etc.). As previously mentioned, records or results may be ranked based, at least in part, on explicit social relevance to a user issuing a query (e.g., user_gender=male, etc.), implicit social relevance to such a user (e.g., user_device=smart phone, pc, etc.), or any combination thereof. Optionally or alternatively, results may be ordered based, at least in part, on recency of social content, such as postings chronology, for example, as was also indicated. In addition, two (or more) records that are equally recent may, for example, be ranked by social relevance and vice-versa. Of course, these are merely examples, and claimed subject matter is not limited in this regard.

At operation 218, a process may further execute instructions on a special purpose computing apparatus to serve or present a listing of ranked search results to a user issuing a query. For example, a process or system may transmit one or more digital signals representing a listing of search results ranked, for example, in accordance with social relevance or chronologically (e.g., in real time, etc.) via an electronic communications network to a user, member, etc. associated with one or more social networks and may be displayed via a user interface, just to illustrate one possible implementation.

Following the above discussion, some example technological components, which may be taken into consideration, in whole or in part, so as to facilitate or support one or more processes or operations in connection with performing on-line social searches, such as, for example, domain-specific on-line searches using social survey-type queries may include those presented in Table 4 below. It should be appreciated that Table 4, which is self-explanatory, is provided herein by way of a non-limiting example, and that claimed subject matter is not limited to particular technological components shown.

TABLE 4

Example technological components.

| Component | What it does | Resources (FTEs) | Choices |
|---|---|---|---|
| query parsing & segmentation | segments query into entities | 1 FTE | qlas |
| query plan computation | generates an execution plan for segmented query | ½ FTE | qlas |
| data store | stores data in flexible schema format | 1 FTE | 1. apache h base<br>2. cassandra<br>3. vespa |
| indexing | indexed & searchable fields + ranking | 2 FTE | 1. lucandra<br>2. vespa |
| stream search | queries real time stream | ½ FTE | esper |

Here, full-time equivalent (FTE) may refer to an estimated measure of involvement or contribution with respect to a particular technological component and provided by way of example only so as to illustrate one particular non-limiting approach. As seen in this illustrated example, technological components may comprise, for example, one or more suitable or desired database management systems, information storage platforms, software, complex event processing (CEP) components, or the like (e.g., Apache, Cassandra, Esper, etc.) that may be used, in whole or in part, in conjunction with one or more implementations described herein. It should be noted that certain technological components, such as, for example, components with respect to content or information storing may depend on or be driven by, at least in part, applicable partnership clauses (e.g., in subscription agreements, etc.). To illustrate, Twitter social information may typically, although not necessarily, be stored for months, and Facebook information may be stored for a certain number of days. Optionally or alternatively, information retention may be driven, at least in part, by entity type (e.g., store restaurant reviews for five months, hotel reviews for three years, etc.). Of course, such details are merely examples, and claimed subject matter is not limited in this regard. Also, those of skill in the art may recognize that one or more components illustrated in Table 4 or otherwise associated with performing domain-specific on-line social searches, for example, may be implemented in a variety of ways or may be rearranged, combined, omitted, etc. without departing from illustrated principles.

Figure 3:
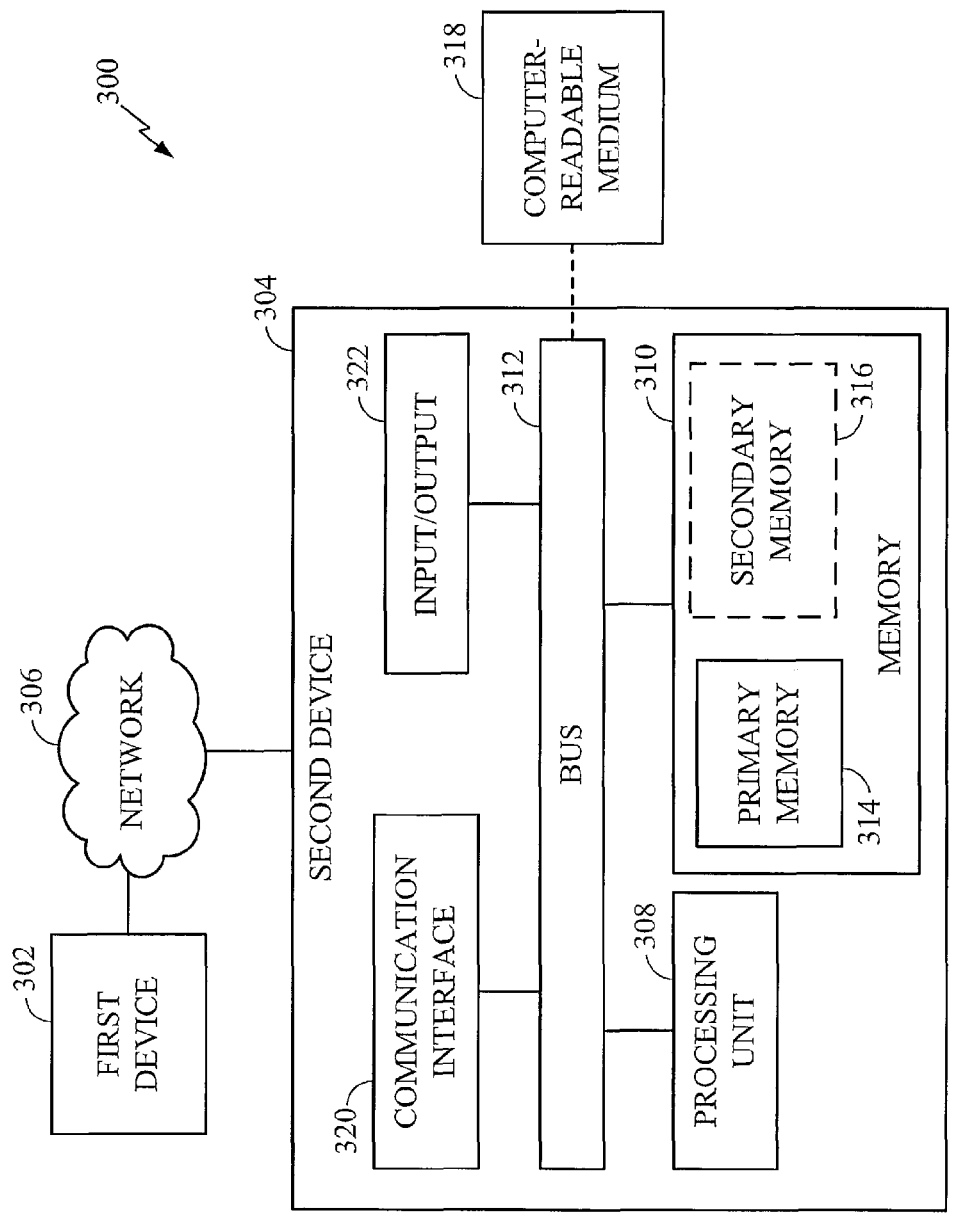
FIG. 3 is a schematic diagram illustrating an implementation of a computing environment associated with one or more special purpose computing apparatuses.

FIG. 3 is a schematic diagram illustrating an example computing environment 300 that may include one or more devices that may be capable of implementing a process in connection with performing on-line social searches, such as, for example, domain-specific on-line searches using social survey-type queries. Computing environment system 300 may include, for example, a first device 302 and a second device 304, which may be operatively coupled together via a network 306. In an embodiment, first device 302 and second device 304 may be representative of any electronic device, appliance, or machine that may have capability to exchange signal information over network 306. Network 306 may represent one or more communication links, processes, or resources having capability to support exchange or communication of signal information between first device 302 and second device 304. Second device 304 may include at least one processing unit 308 that may be operatively coupled to a memory 310 through a bus 312. Processing unit 308 may represent one or more circuits to perform at least a portion of one or more signal information computing procedures or processes.

Memory 310 may represent any signal storage mechanism. For example, memory 310 may include a primary memory 314 and a secondary memory 316. Primary memory 314 may include, for example, a random access memory, read only memory, etc. In certain implementations, secondary memory 316 may be operatively receptive of, or otherwise have capability to be coupled to, a computer-readable medium 318.

Computer-readable medium 318 may include, for example, any medium that can store or provide access to signal information, such as, for example, code or instructions for one or more devices in operating environment 300. It should be understood that a storage medium may typically, although not necessarily, be non-transitory or may comprise a non-transitory device. In this context, a non-transitory storage medium may include, for example, a device that is physical or tangible, meaning that the device has a concrete physical form, although the device may change state. For example, one or more electrical binary digital signals representative of information, in whole or in part, in the form of zeros may change a state to represent information, in whole or in part, as binary digital electrical signals in the form of ones, to illustrate one possible implementation. As such, "non-transitory" may refer, for example, to any medium or device remaining tangible despite this change in state.

Second device 304 may include, for example, a communication adapter or interface 320 that may provide for or otherwise support communicative coupling of second device 304 to a network 306. Second device 304 may include, for example, an input/output device 322. Input/output device 322 may represent one or more devices or features that may be able to accept or otherwise input human or machine instructions, or one or more devices or features that may be able to deliver or otherwise output human or machine instructions.

According to an implementation, one or more portions of an apparatus, such as second device 304, for example, may store one or more binary digital electronic signals representative of information expressed as a particular state of a device such as, for example, second device 304. For example, an electrical binary digital signal representative of information may be "stored" in a portion of memory 310 by affecting or changing a state of particular memory locations, for example, to represent information as binary digital electronic signals in the form of ones or zeros. As such, in a particular implementation of an apparatus, such a change of state of a portion of a memory within a device, such a state of particular memory locations, for example, to store a binary digital electronic signal representative of information constitutes a transformation of a physical thing, for example, memory device 310, to a different state or thing.

Thus, as illustrated in various example implementations or techniques presented herein, in accordance with certain aspects, a method may be provided for use as part of a special purpose computing device or other like machine that accesses digital signals from memory or processes digital signals to establish transformed digital signals which may be stored in memory as part of one or more information files or a database specifying or otherwise associated with an index, social or otherwise.

Some portions of the detailed description herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described or shown herein using various methods or systems, it should be understood by those skilled in the art that various other modifications may be made, or equivalents may be substituted, without departing from claimed subject matter. Additionally, many modifications may be made to adapt a particular situation to the teachings of claimed subject matter without departing from the central concept(s) described herein. Therefore, it is intended that claimed subject matter not be limited to particular examples disclosed, but that claimed subject matter may also include all implementations falling within the scope of the appended claims, or equivalents thereof.

What is claimed is:

1. A computing platform, comprising:
one or more computing devices to:
implement a social survey query using a GUI; and
electronically process a social survey query of a user to rank domain-specific content of one or more on-line social networks of said user, wherein results received in response to one or more digital signals representing said social survey query are ranked based, at least in part, on social relevance to said user.

2. The computing platform of claim 1, wherein said one or more computing devices are additionally to:
implement said social survey query using a user-selectable toolbar.

3. The computing platform of claim 2, wherein said one or more computing devices are additionally to:
implement said user-selectable toolbar on a social network webpage.

4. The computing platform of claim 1, wherein said one or more computing devices are additionally to:
accept one or more status updates.

5. The computing platform of claim 1, wherein said one or more computing devices are additionally to determine said social relevance based, at least in part, on explicit social relevance to said user; implicit social relevance to said user; or any combination thereof.

6. The computing platform of claim 5, wherein said one or more computing devices are additionally to determine said social relevance based, at least in part, on a current location of said user.

7. A method comprising:
electronically processing by a server a social survey query of a user to rank domain-specific content of one or more on-line social networks of said user, said social survey query being implemented using an graphical user interface (GUI) to a search engine; and
wherein results received in response to one or more digital signals representing said social survey query are ranked based, at least in part, on social relevance to said user.

8. The method of claim 7, wherein said (GUI) to said search engine comprises a user-selectable toolbar to implement said social survey query.

9. The method of claim 7, wherein said (GUI) to said search engine is present on a webpage of a social network.

10. The method of claim 9, wherein said webpage accepts one or more status updates from users.

11. The method of claim 7, wherein said search engine accesses on-line social content in a listing of search results returned in response to a query.

12. The method of claim 7, wherein said social relevance at least comprises implicit social relevance.

13. The method of claim 12, wherein said implicit social relevance comprises a current location of a user.

14. The method of claim 13, wherein said current location of said user is determined via a media access control (MAC) address.

15. The method of claim 7, wherein said social relevance at least comprises explicit social relevance.

16. The method of claim 15, wherein said explicit social relevance is associated with gender of said user.

17. An article comprising:
a non-transitory storage medium comprising machine-readable instructions stored thereon which are executable by a special purpose computing device to:
integrate a social survey query toolbar and a search engine interface resulting, at least in part, in ranking domain-specific content of one or more on-line social networks of a user, wherein results received in response to said social survey query are ranked based, at least in part, on social relevance to said user.

18. The article of claim 17, wherein said non-transitory storage medium comprising machine-readable instructions stored thereon are additionally to:
determine implicit social relevance to said user based, at least in part, on a current location of said user.

19. The article of claim 17, wherein said non-transitory storage medium comprising machine-readable instructions stored thereon are additionally to:
determine social relevance to said user based, at least in part, on demographics of said user.

20. The article of claim 17, wherein said non-transitory storage medium comprising machine-readable instructions stored thereon are additionally to:
determine social relevance to said user based, at least in part, on recency of social content.

* * * * *